(12) United States Patent
Tamor

(10) Patent No.: US 6,196,344 B1
(45) Date of Patent: Mar. 6, 2001

(54) CONTROL SYSTEM AND METHOD FOR A HYBRID ELECTRIC VEHICLE

(75) Inventor: Michael Alan Tamor, Toledo, OH (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/394,373

(22) Filed: Sep. 10, 1999

(51) Int. Cl.[7] ........................................ B60K 1/00
(52) U.S. Cl. .......................................... 180/65.4; 180/65.2
(58) Field of Search ................................... 180/65.1, 65.2, 180/65.3, 65.4, 65.8, 165; 477/2, 3, 20, 16; 318/139, 140, 141, 153

(56) References Cited

U.S. PATENT DOCUMENTS

| | | |
|---|---|---|
| 5,720,690 | 2/1998 | Hara et al. . |
| 5,751,137 | 5/1998 | Kiuchi et al. . |
| 5,788,004 | 8/1998 | Friedmann et al. . |
| 5,808,427 | 9/1998 | Worden et al. . |
| 5,821,706 | 10/1998 | Koga . |
| 5,841,201 | 11/1998 | Tabata et al. . |
| 5,847,520 | 12/1998 | Theurillat et al. . |
| 5,862,497 | 1/1999 | Yano et al. . |

Primary Examiner—Richard M. Camby
(74) Attorney, Agent, or Firm—Mark S. Sparschu

(57) ABSTRACT

Several control methods are presented for application in a hybrid electric vehicle powertrain including in various embodiments an engine, a motor/generator, a transmission coupled at an input thereof to receive torque from the engine and the motor generator coupled to augment torque provided by the engine, an energy storage device coupled to receive energy from and provide energy to the motor/generator, an engine controller (EEC) coupled to control the engine, a transmission controller (TCM) coupled to control the transmission and a vehicle system controller (VSC) adapted to control the powertrain.

21 Claims, 2 Drawing Sheets

CONTROL SYSTEM AND METHOD FOR A HYBRID ELECTRIC VEHICLE

This invention was made with Government support under Prime Contract No. DE-AC3683CH10093, Subcontract No. ZCB-4-13032-02, awarded by the Department of Energy. The Government has certain rights in the invention.

BACKGROUND OF THE INVENTION

1. Field of the Invention

The present invention relates to control systems and methods for hybrid electric vehicles.

2. Description of the Related Art

In a hybrid electric vehicle, a plurality of torque sources are available. Typically, such sources include an engine such as an internal combustion engine, and an electric machine. In one general topology of hybrid electric vehicles, the electric machine is a motor/generator interposed between the engine and the vehicle's transmission. The motor/generator can add torque to supplement the torque provided by engine. Further, the motor/generator can act as a generator in order to convert excess engine torque into electric energy for storage in a storage device such as a battery. This function as a generator can be in furtherance of the driver's request for the vehicle to decelerate (i.e., regenerative braking). The motor/generator can also act as a generator in a manner transparent to the driver of the vehicle, in order to assure that the battery maintains a reasonable state of charge.

Coordinated control of the engine, motor/generator and transmission is, of course, paramount for excellent vehicle performance. In one possible control partitioning, three controllers can be provided: an electronic engine controller (EEC), a transmission controller (TCM) and a vehicle system controller (VSC). In such a partitioning, the EEC would provide generally traditional engine control functions. The TCM would also provide generally traditional transmission control functions. The VSC would take accelerator position, vehicle speed, battery state of charge and other variables into consideration and partition a driver-commanded torque (as expressed primarily by accelerator position) into a desired motor/generator torque and a desired engine torque.

The driver-commanded torque would be provided from the VSC to both the EEC and the TCM. Because the TCM needs actual torque at its input for its control as well, the VSC provides a signal reflecting the sum of actual motor/generator torque (which the VSC knows because it performs control of the motor/generator) and actual measured engine torque or estimated engine torque (estimated within the VSC). When a transmission shift is impending or underway, the TCM provides a commanded transmission input torque to the VSC, which acts to cause the torque at the input to the transmission to conform to the command. This commanded torque allows the TCM to perform its shift as appropriate.

There are several concerns with the aforementioned control method. First, it requires the VSC to be able to anticipate dynamic effects, such as, for example, the effects of dynamic fueling strategy and manifold air flow, on actual engine torque, whereas in fact the EEC is the controller having the best knowledge of that information. This may be addressed in two ways, neither entirely satisfactory: 1) an engine torque sensor may be included in the system, or 2) the engine torque may be estimated within the EEC which has far better access to all engine control, sensor and calibration variables, as well as the control strategy itself. The first is an unusual and expensive solution, while the second will introduce a time delay during which the engine torque is computed in the EEC, passed to the VSC for combination with the starter/alternator torque and then passed to the TCM. This time delay will result in poor transmission shift quality. These specific issues derive from the genesis of this hierarchical control in a parallel HEV where the engine and electric machine each contribute substantial torque to propel the vehicle either separately or in combination. In such a case, it is absolutely essential that the VSC intervene completely in the connection between driver demand and the actual engine control inputs. In another type of HEV, the so-called "low storage requirement" or LSR hybrid having the topology described above, the torque contribution of the motor/generator is very small compared to that of the engine, and the vehicle has no electric-only propulsion mode at all. Thus the LSR system can take great advantage of the familiarity and proven base of control methodology of the more accustomed direct driver control of the engine with less severe intervention by the VSC. Such a strategy also allows use of non-hybrid powertrain components and controls with minimal modification.

SUMMARY OF THE INVENTION

It is an object of the present invention to overcome the above-described drawbacks of alternative control methods for hybrid electric vehicles.

The present invention provides several control methods adapted for application in a hybrid electric vehicle powertrain including in various embodiments an engine, a motor/generator, a transmission coupled at an input thereof to receive torque from the engine and the motor generator coupled to augment torque provided by the engine, an energy storage device coupled to receive energy from and provide energy to the motor/generator, an engine controller (EEC) coupled to control the engine, a transmission controller (TCM) coupled to control the transmission and a vehicle system controller (VSC) adapted to control the powertrain.

In one embodiment, the present invention provides a method for controlling the powertrain comprising: (a) providing a signal from the EEC to the TCM to reflect a sum of an actual or estimated electric machine torque and an actual or estimated engine output torque; (b) providing a signal from the TCM to the EEC to reflect a TCM-commanded transmission input torque; and (c) partitioning the TCM-commanded transmission input torque signal into a TCM-commanded engine torque signal and a TCM-commanded electric machine torque signal.

In a second embodiment, the present invention provides a method for controlling the powertrain comprising: (a) providing an accelerator position signal to the VSC; (b) in the VSC, calculating a first desired electric machine torque to reflect a driver-commanded boost or regenerative torque, the first desired electric machine torque being a function of the accelerator position signal; (c) providing a modified accelerator position signal from the VSC to the EEC, the modified accelerator position signal reaching 100% before the first accelerator position signal; and (d) controlling output torque of the engine at least partly as a function of the modified accelerator position signal.

In a third embodiment, the present invention provides a method for controlling the powertrain comprising: (a) providing an accelerator position signal to the VSC; (b) in the VSC, calculating a first desired electric machine torque to reflect a driver-commanded boost or regenerative torque, the first desired electric machine torque being a function of the accelerator position signal; (c) controlling output torque of the engine at least partly as a function of the accelerator position signal; (d) in the VSC, calculating a second desired electric machine torque to reflect a battery-charge-maintenance torque; (e) controlling the electric machine in view of the first desired electric machine torque and the second desired electric machine torque; (f) providing a first signal from the VSC to the EEC to reflect a driver-commanded boost or regenerative torque of the electric machine; and (g) providing a second signal from the VSC to the EEC to reflect a battery-charge maintenance torque of the electric machine.

DETAILED DESCRIPTION OF THE PREFERRED EMBODIMENT

Figure 1:
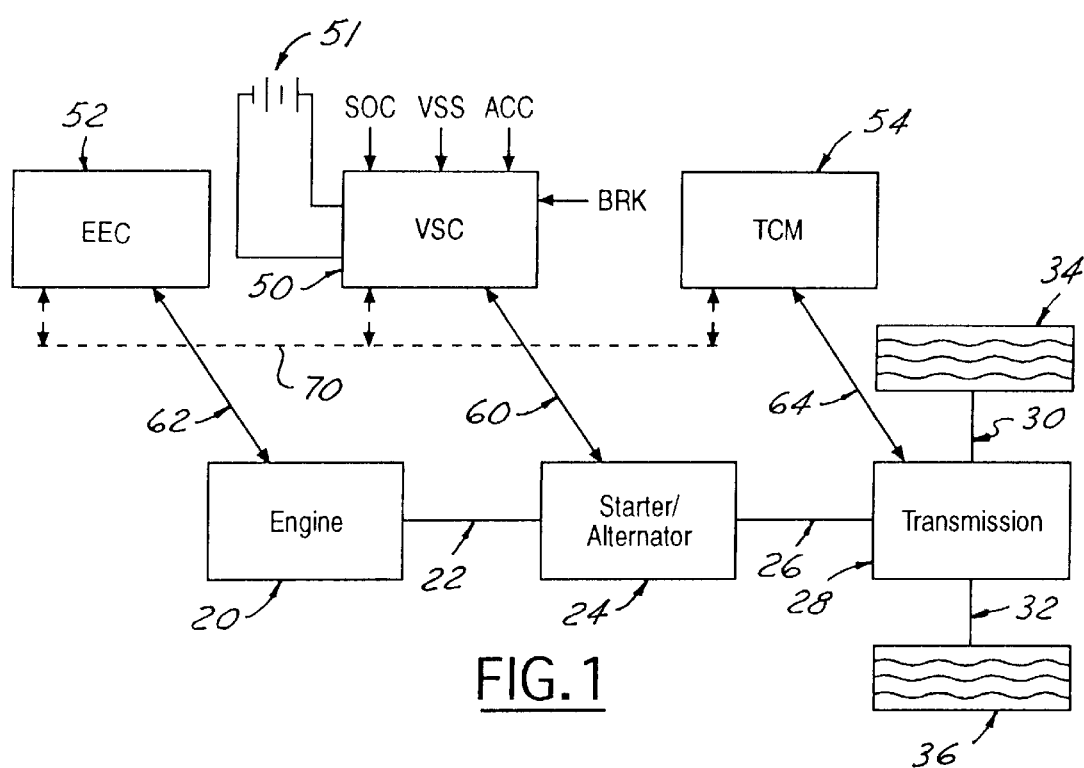
FIG. 1 is a block diagram of the powertrain of a hybrid electric vehicle according to one embodiment of the present invention.

Refer first to FIG. 1. Illustrated there is the "topology" of a hybrid electric vehicle powertrain according to one embodiment of the present invention. An engine 20, such as an internal combustion engine, is coupled at its crankshaft 22 to a motor/generator such as starter/alternator 24. Starter/alternator 24 is preferably, though not necessarily, a polyphase induction machine. Starter/alternator 24 is coupled to input 26 of a transmission 28. In this embodiment, transmission 28 is an "automatic shift manual (ASM)" transmission/transaxle, though other transmission configurations can be readily substituted as well. Wheel shafts 30 and 32 couple torque from transmission 28 to drive wheels 34 and 36 of the vehicle. Depending upon the exact functionality required of the powertrain, clutches can be provided between engine 20 and starter/alternator 24, and/or between starter/alternator 24 and transmission 28.

A vehicle system controller (VSC) 50 receives inputs from the vehicle driver and regarding vehicle operation, such as (for example) accelerator pedal position (ACC), brake pedal force (BRK), vehicle speed (VSS) and battery state of charge (SOC). The VSC 50's processing of those signals will be discussed in detail below. VSC 50 is preferably a microprocessor-based module having appropriate microcomputer resources (throughput, memory, inputs, outputs and the like) to perform the functions ascribed to it in this disclosure. In this embodiment of the present invention, VSC 50 also preferably includes the semiconductor switches to perform the inverter function of converting DC power stored in battery 51 to AC power for use when starter/alternator 24 acts as a motor, and for rectifying the AC power generated by starter/alternator 24 for storage in battery 51. However, the inverter can also be a module separate from VSC 50.

An electronic engine controller (EEC) 52 provides traditional control functions for engine 20, including fuel injection control. If engine 20 is a spark ignition engine, EEC 52 can also provide control for an electronic throttle. A transmission control module (TCM) 54 provides control for transmission 28. EEC 52 and TCM 54 are preferably microprocessor based devices.

VSC 50 is coupled to starter/alternator 24 by a plurality of circuits collectively referred to with reference numeral 60.

EEC 52 is similarly coupled to engine 20 by a plurality of circuits collectively referred to with reference numeral 62. Also, TCM 54 is coupled to transmission 28 by a plurality of circuits collectively referred to with reference numeral 64. Circuits 60, 62 and 64 are selected to be appropriate for control of the various powertrain components as known to those skilled in the art and as further described below.

VSC 50, EEC 52 and TCM 54 are also coupled by a high speed data link 70, such as a Controller Area Network (CAN) data link.

Figure 2:
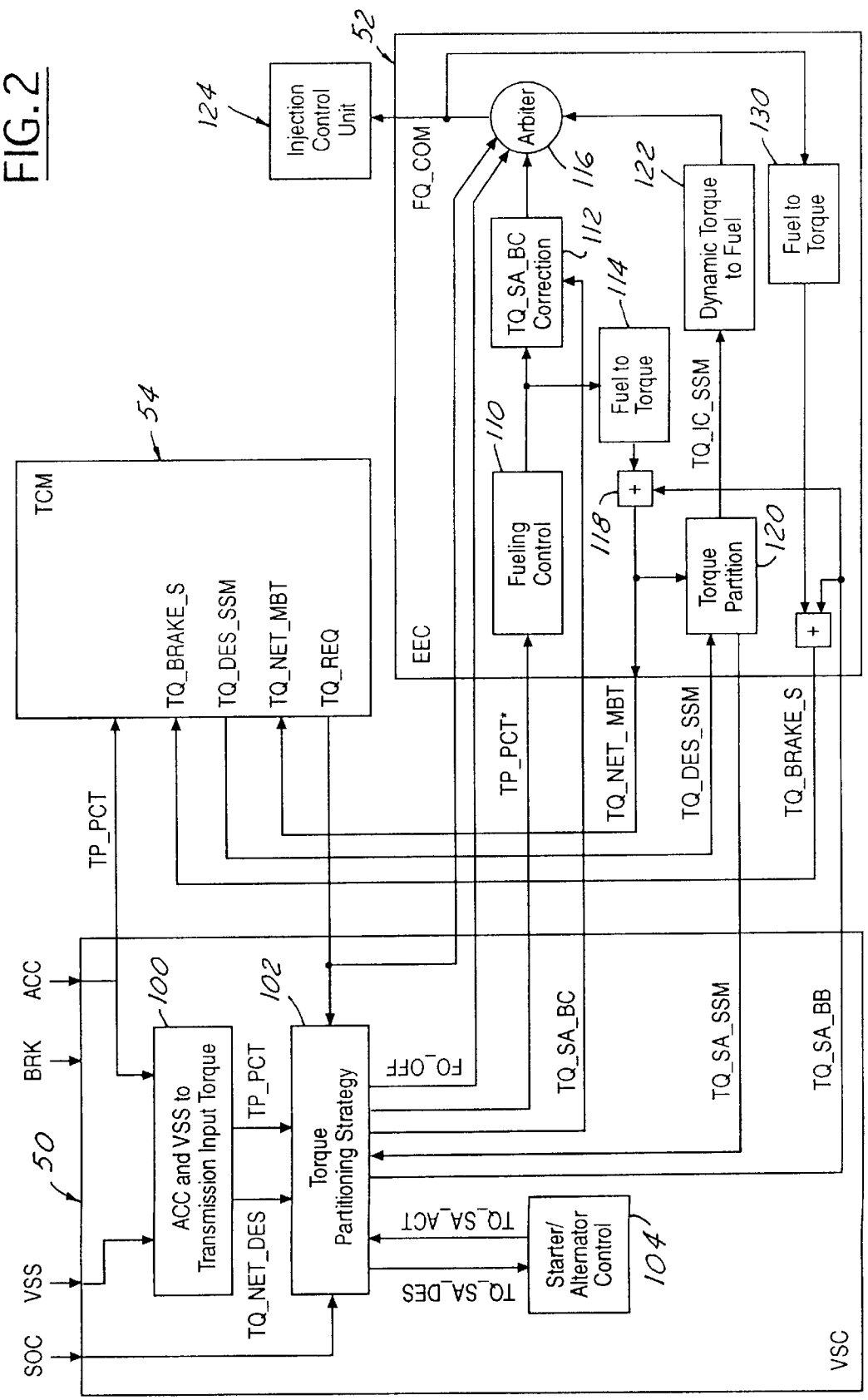
FIG. 2 is a block diagram illustrating in more detail the control functions performed by vehicle system controller (VSC) 50, engine controller (EEC) 52 and transmission control module (TCM) 54 of FIG. 1, and the signals passed among those controllers.

Refer now additionally to FIG. 2, where the functions of VSC 50, EEC 52 and TCM 54 and the signal flow among them are illustrated in more detail. VSC reads vehicle speed (VSS) and accelerator position (ACC) signals, and at functional block 100, generates signals TQ_NET_DES and TP_PCT. TQ_NET_DES indicates the target torque to be provided by the combination of engine 20 and starter/alternator 24. TQ_NET_DES is a function of ACC (i.e., the driver's "expressed" command for torque) and vehicle speed VSS. The accelerator position signal ACC, expressed as a percentage of full throttle, is passed on from block 100 as signal TP_PCT. TP_PCT is also passed on to TCM 54 via data link 70.

At functional block 102, VSC 50 partitions TQ_NET_DES. VSC 50 determines, based on state of charge (SOC) of battery 51, whether starter/alternator 24 needs to either generate electrical power to charge battery 51 (if the SOC of battery 51 is below an acceptable threshold), or needs to bleed charge from battery 51 (if the SOC of battery 51 is above an acceptable threshold). The torque command for these "battery maintenance" functions is provided as signal TQ_SA_BC to EEC 52 via data link 70.

At block 102, VSC 50 also generates a boost torque signal TQ_SA_BB. This signal represents boost (or conversely, drag) torque to be applied by starter/alternator 24 as a result of the driver's command as expressed by accelerator position signal ACC or brake pedal force BRK. This signal is generated at block 102 through very general a priori knowledge of the torque generating characteristics of engine 20. If the driver is demanding more torque than engine 20 can generate, boost torque via signal TQ_SA_BB will be indicated (assuming the SOC of battery 51 is appropriately high to provide energy for the boost torque, and subject to limiting in view of signal TQ_SA_SSM, as will be discussed below).

The sum of the two starter/alternator torque signals TQ_SA_BB (subject to limiting in view of signal TQ_SA_SSM) and TQ_SA_BC is provided by functional block 102 as a desired starter/alternator torque signal TQ_SA_DES to functional block 104. Functional block 104 provides control for starter/alternator 24, such that starter/alternator 24 provides the torque indicated by TQ_SA_DES. Such control can be in accordance of any of numerous conventional electric machine control methods known in the art. From functional block 104, an actual starter/alternator torque TQ_SA_ACT is provided to functional block 102. TQ_SA_ACT is provided to serve several purposes. First, temperature and/or voltage limitations in the motor or inverter may unexpectedly limit available torque. Second, there may be a small delay in generating the desired torque. Third, TQ_SA_ACT is used to compute TQ_SA_BB for use by VSC 50.

A signal TP_PCT* is also provided from VSC 50 to EEC 52. The value of TP_PCT* is preferably an augmented version of TP_PCT, increased to reach 100% before TP_PCT reaches 100%. Thus, the accelerator position signal to EEC 52 will reach its maximum value before the actual accelerator position signal reaches 100%. The remainder of the range for TP_PCT is available to indicate the driver's desire for starter/alternator boost. Alternatively, TP_PCT* can be equal to TP_PCT. Also alternatively, TP_PCT* can instead be a direct torque command for engine 20, as opposed to a signal in units of accelerator pedal position.

Within EEC 52, TP_PCT* is provided to functional block 110, where traditional fueling control is performed based at least in part on throttle position, including any limits or filters which may typically be applied to assure reasonable driveability and emissions. The output of block 110 is provided to functional block 112, where a fuel correction factor is added (or subtracted) based on the battery maintenance torque TQ_SA_BC. The fuel correction makes the battery maintenance torque transparent to the driver of the vehicle. The output of block 112 is provided to an arbiter block 116, as will be discussed below.

The output of block 110 is also provided to block 114, which contains a map of fuel to output torque of engine 20. The output of block 114 is summed with TQ_SA_BB at summing block 118 in order to generate a signal TQ_NET_MBT. This signal, which represents a target torque to be provided at the input to transmission 28, is provided to TCM 54 via data link 70.

If a transmission shift is impending or in progress, TCM 54 requires control of torque at its input in order to facilitate that shift. Therefore, TCM 54 provides a signal TQ_DES_SSM, which represents input torque to transmission 28 commanded by TCM 54, to EEC 52. (TCM 54 may also send a flag, TQ_REQ, to VSC 50 and EEC 52 to indicate that TCM 54 desires to take control of the torque.) At functional block 120, EEC partitions the commanded torque TQ_DES_SSM into an engine 20 torque, TQ_IC_SSM, and a starter/alternator 24 torque, TQ_SA_SSM. In order to allow engine 20 to run as much in a steady state condition as possible, functional block 120 will preferably partition the torques such that the torque of starter/alternator 24 is reduced first and added back in last.

At functional block 122, a fueling map to convert torque command TQ_IC_SSM into a fueling command is applied. The fueling commands from blocks 112 and 122 are arbitrated at block 116. If flag TQ_REQ indicates that TCM 54 has assumed torque control, arbiter block 116 will pass the fuel command from block 122. If flag FQ_OFF indicates that engine 20 is to be stopped, arbitration block 116 commands no fuel. The output of arbitration block 116 is a fuel command FQ_COM, which is provided to a conventional fuel injection control system, generically shown at functional block 124.

FQ_COM, the actual fuel command provided to engine 20 (and therefore a measure of torque being produced by engine 20), is provided to functional block 130, which estimates the output torque of engine 20 based upon the actual fuel command FQ_COM and other engine parameters. This estimate is preferably based on a map stored a priori in the memory of EEC 52. The output of block 130, estimated engine torque, is combined with TQ_SA_BB at summing block 132, in order to yield a signal TQ_BRAKE_S. TQ_BRAKE_S, a measure of the actual torque being provided to the input of transmission 28, is provided via data link 70 to TCM 54 for use in TCM 54's control of transmission 28. The control by TCM 54 of transmission 28 is according to conventional control methods known to those skilled in the art.

Signal TQ_SA_SSM, the starter/alternator component of the torque command from TCM 54, is provided from EEC 52 to VSC 50. TQ_SA_SSM is used by torque partitioning block 102 in determining TQ_SA_BB, the driver-desired boost torque and, consequently, TQ_SA_DES, the total commanded torque to which starter/alternator 24 is controlled by functional block 104. In general, if a torque is commanded via TQ_SA_SSM, this torque will override other considerations in determining TQ_SA_BB and, consequently, TQ_SA_DES.

Signal FQ_OFF is provided by VSC 50 to EEC 52 if it is desired for engine 20 to be stopped. This is advantageous for fuel savings in conditions where the vehicle would otherwise be idling. Signal FQ_OFF causes EEC 52 to cut off fuel from engine 20. Using starter/alternator 24, engine 20 can be restarted very quickly upon demand for power from ACC.

Control partitioning according to this embodiment of the present invention has the following advantages. First, VSC 50 is not required to know in detail the dynamic torque-producing characteristics of engine 20. VSC 50 needs only very general knowledge of these characteristics in order to perform torque partitioning at functional block 102. Any inaccuracies will have relatively limited effect, as the starter/alternator in a "low storage requirement" hybrid electric vehicle contributes much less torque than does the engine. Further, because the driver's command for vehicle torque is provided to EEC 52 by signal TP_PCT*, the driver can correct for any errors which occur in torque partitioning (that is, the driver remains "in the loop" of torque partitioning in the system).

A further advantage of this embodiment of the present invention is that the measure of actual transmission input torque, signal TQ_BRAKE_S, is provided to TCM 54 by EEC 52 rather than by VSC 50. If provided by VSC 50, as discussed in the Background section above, part of the data for actual transmission input torque (specifically, the component provided by the engine) is delayed in reaching TCM 54. This can result in inadequate shift quality. In this embodiment of the present invention, there is a delay in VSC 50's responding to TCM 54's torque command TQ_SA_SSM, because that signal is routed through EEC 52. However, because the contribution of starter/alternator torque to total powertrain torque is relatively small and starter/alternator 24 responds much more quickly to its torque command than does engine 20, this delay will not have a large effect on shift quality.

A further advantage of this embodiment of the present invention is in aiding the vehicle development process. VSC 50 does not need detailed engine control information. Further, TCM 54 operates as would a transmission controller in a non-hybrid vehicle, with the same inputs and outputs. Therefore, the algorithm development for VSC 50, TCM 54 and EEC 52 can proceed with relatively little interaction. This will lower costs and accelerate development by sharing both hardware and control with conventional (i.e., non-hybrid) powertrain systems.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

I claim:
1. In a hybrid electric vehicle powertrain including an engine, a motor/generator, a transmission coupled at an input thereof to receive torque from said engine and said motor/generator coupled to augment torque provided by said engine, an energy storage device coupled to receive energy from and provide energy to said motor/generator and a vehicle system controller (VSC) adapted to control said powertrain, a method for controlling said powertrain comprising:
   providing an accelerator position signal to said VSC;
   in said VSC, calculating a first desired electric machine torque to reflect a driver-commanded boost or regenerative torque, said first desired electric machine torque being a function of said accelerator position signal;
   controlling output torque of said engine at least partly as a function of said accelerator position signal;
   in said VSC, calculating a second desired electric machine torque to reflect a battery-charge-maintenance torque; and
   controlling said electric machine in view of said first desired electric machine torque and said second desired electric machine torque.

2. A method as recited in claim 1, wherein said powertain further includes and engine controller (EEC) coupled to control said engine, said method further comprising:
   providing a first signal from said VSC to said EEC to reflect a driver-commanded boost or regenerative torque of said electric machine; and
   providing a second signal from said VSC to said EEC to reflect a battery-charge maintenance torque of said electric machine.

3. A method as recited in claim 2, further comprising:
   generating a first desired engine torque signal as a function of said accelerator position signal; and
   generating a second desired engine torque signal as a function of said first desired engine torque signal and said second signal.

4. A method as recited in claim 3, wherein said powertrain further includes a transmission controller (TCM) coupled to control said transmission, said method further comprising:
   if a transmission shift event is impending or in progress, providing a TCM-desired transmission input torque signal from said TCM to said EEC;
      in said EEC, partitioning said TCM-desired transmission input torque signal into a TCM-desired engine torque signal and a TCM-desired electric machine torque signal.

5. A method as recited in claim 4, further comprising:
   controlling output torque of said engine in view of said first desired engine control signal and said TCM-desired engine torque signal.

6. A method as recited in claim 5, further comprising:
   providing said TCM-desired electric machine torque signal from said EEC to said VSC;
   controlling said electric machine in view of said first desired electric machine torque, said second desired electric machine torque and said TCM-desired electric machine torque signal.

7. A method as recited in claim 6, further comprising:
   providing a third signal from the EEC to the TCM to reflect a target input torque to said transmission, said target input torque to said transmission being a sum of said driver-commanded boost or regenerative torque, and said second desired engine torque signal.

8. A method as recited in claim 7, further comprising:
   providing a fourth signal from the EEC to the TCM to reflect a sum of a total engine output torque and said boost or regenerative torque.

9. In a hybrid electric vehicle powertrain including an engine, a motor/generator, a transmission coupled at an input thereof to receive torque from said engine and said motor/generator coupled to augment torque provided by said engine, an energy storage device coupled to receive energy from and provide energy to said motor/generator, an engine controller (EEC) coupled to control said engine and a vehicle system controller (VSC) adapted to control said powertrain, a method for controlling said powertrain comprising:
   providing an accelerator position signal to said VSC;
   in said VSC, calculating a first desired electric machine torque to reflect a driver-commanded boost or regenerative torque, said first desired electric machine torque being a function of said accelerator position signal;
   providing a modified accelerator position signal from said VSC to said EEC, said modified accelerator position signal reaching 100% before said first accelerator position signal; and
   controlling output torque of said engine at least partly as a function of said modified accelerator position signal.

10. A method as recited in claim 9, further comprising:
   in said VSC, calculating a second desired electric machine torque to reflect a battery-charge-maintenance torque; and
   controlling said electric machine in view of said first desired electric machine torque and said second desired electric machine torque.

11. A method as recited in claim 10, further comprising:
   providing a first signal from said VSC to said EEC to reflect a driver-commanded boost or regenerative torque of said electric machine; and
   providing a second signal from said VSC to said EEC to reflect a battery-charge maintenance torque of said electric machine.

12. A method as recited in claim 11, further comprising:
   generating a first desired engine torque signal as a function of said modified accelerator position signal; and
   generating a second desired engine torque signal as a function of said first desired engine torque signal and said second signal.

13. A method as recited in claim 12, wherein said powertrain further includes a transmission controller (TCM) coupled to control said transmission, said method further comprising:
   if a transmission shift event is impending or in progress, providing a TCM-desired transmission input torque signal from said TCM to said EEC;
      in said EEC, partitioning said TCM-desired transmission input torque signal into a TCM-desired engine torque signal and a TCM-desired electric machine torque signal.

14. A method as recited in claim 13, further comprising:
   controlling output torque of said engine in view of said first desired engine control signal and said TCM-desired engine torque signal.

15. A method as recited in claim 14, further comprising:
   providing said TCM-desired electric machine torque signal from said EEC to said VSC;
   controlling said electric machine in view of said first desired electric machine torque, said second desired electric machine torque and said TCM-desired electric machine torque signal.

16. A method as recited in claim 15, further comprising:
providing a third signal from the EEC to the TCM to reflect a target input torque to said transmission, said target input torque to said transmission being a sum of said driver-commanded boost or regenerative torque, and said second desired engine torque signal.

17. A method as recited in claim 16, further comprising:
providing a fourth signal from the EEC to the TCM to reflect a sum of a total engine output torque and said boost or regenerative torque.

18. In a hybrid electric vehicle powertrain including an engine, a motor/generator, a transmission coupled at an input thereof to receive torque from said engine and said motor/generator coupled to augment torque provided by said engine, an energy storage device coupled to receive energy from and provide energy to said motor/generator, an electronic engine controller (EEC coupled to control said engine and a transmission controller (TCM) coupled to control said transmission, a method for controlling said powertrain comprising:
providing a signal from said EEC to said TCM to reflect a sum of an actual or estimated electric machine torque and an actual or estimated engine output torque;
providing a signal from said TCM to said EEC to reflect a TCM-commanded transmission input torque;
partitioning said TCM-commanded transmission input torque signal into a TCM-commanded engine torque signal and a TCM-commanded electric machine torque signal.

19. A method as recited in claim 18, wherein said powertrain further comprises a vehicle system controller (VSC) adapted to control said powertrain and wherein said TCM-commanded electric machine torque signal is provided from said EEC to said VSC.

20. A method as recited in claim 19, further comprising:
in said VSC, calculating a first desired electric machine torque to reflect a driver-commanded boost or regenerative torque;
in said VSC, calculating a second desired electric machine torque to reflect a battery-charge-maintenance torque; and
controlling said electric machine in view of said first desired electric machine torque, said second desired electric machine torque and said TCM-commanded electric machine torque signal.

21. A method as recited in claim 20, wherein, when a transmission shift is impending or is in progress, said TCM-commanded electric machine torque signal overrrides at least said first desired electric machine torque.

* * * * *